(12) United States Patent
Tobishima et al.

(10) Patent No.: US 12,135,248 B2
(45) Date of Patent: Nov. 5, 2024

(54) TEMPERATURE SENSOR

(71) Applicant: OHIZUMI MFG. CO., LTD., Saitama (JP)

(72) Inventors: Kenji Tobishima, Aomori (JP); Hiromi Okada, Aomori (JP); Yuji Takano, Aomori (JP)

(73) Assignee: OHIZUMI MFG. CO., LTD., Saitama (JP)

( * ) Notice: Subject to any disclaimer, the term of this patent is extended or adjusted under 35 U.S.C. 154(b) by 491 days.

(21) Appl. No.: 17/616,774

(22) PCT Filed: Nov. 27, 2020

(86) PCT No.: PCT/JP2020/044266
§ 371 (c)(1),
(2) Date: Dec. 6, 2021

(87) PCT Pub. No.: WO2021/131493
PCT Pub. Date: Jul. 1, 2021

(65) Prior Publication Data
US 2022/0307917 A1  Sep. 29, 2022

(30) Foreign Application Priority Data

Dec. 24, 2019 (JP) .................................. 2019-232961

(51) Int. Cl.
*G01K 7/22* (2006.01)
*H01C 1/024* (2006.01)
*H01C 7/00* (2006.01)

(52) U.S. Cl.
CPC ............... *G01K 7/22* (2013.01); *H01C 1/024* (2013.01); *H01C 7/008* (2013.01)

(58) Field of Classification Search
CPC ........... G01K 7/22; H01C 1/024; H01C 7/008
See application file for complete search history.

(56) References Cited

U.S. PATENT DOCUMENTS 4,437,084 A * 3/1984 Clayton, Jr. ............. G01K 7/22
                                              374/E7.028
5,367,282 A * 11/1994 Clem ..................... H01C 1/028
                                              338/26

(Continued)

FOREIGN PATENT DOCUMENTS

JP           1-112432         7/1989
JP           5-77738         10/1993

(Continued)

OTHER PUBLICATIONS

International Search Report (ISR) issued Dec. 28, 2020 in International (PCT) Application No. PCT/JP2020/044266.

*Primary Examiner* — Randy W Gibson
(74) *Attorney, Agent, or Firm* — Wenderoth, Lind & Ponack L.L.P.

(57) ABSTRACT

A temperature sensor includes: a thermistor; first and second lead-out wires, each having a front end connected to the thermistor; a glass body for sealing the thermistor and a front end portion of each of the first and second lead-out wires; first and second lead wires having respective front ends connected to rear ends of the first and second lead-out wires, respectively; and a synthetic resin cover layer formed of a laminate of an inner layer and a tubular outer layer. The tubular outer layer covers the glass body such that the glass body is in direct contact with an inner surface of the tubular outer layer. The inner layer covers: (i) the first and second lead-out wires except for the front end portions thereof; and (ii) a front end portion of each of the first and second lead wires.

6 Claims, 2 Drawing Sheets

(56) References Cited

U.S. PATENT DOCUMENTS

| | | | |
|---|---|---|---|
| 7,075,407 B1* | 7/2006 | Kawamoto | H01C 1/1413 |
| | | | 374/E1.018 |
| 10,156,483 B2* | 12/2018 | Yoshihara | G01K 1/16 |
| 2013/0077635 A1* | 3/2013 | Deivasigamani | G06F 13/4045 |
| | | | 370/402 |
| 2017/0016777 A1* | 1/2017 | Yoshihara | G01K 1/08 |
| 2018/0346370 A1* | 12/2018 | Kobayashi | H01C 1/028 |
| 2019/0265108 A1 | 8/2019 | Yoshihara et al. | |
| 2020/0182708 A1* | 6/2020 | Yoshihara | H02K 11/25 |
| 2020/0249097 A1 | 8/2020 | Ogura | |
| 2021/0164847 A1* | 6/2021 | Melnychuk | G01K 7/22 |
| 2021/0210256 A1* | 7/2021 | Lee | H01C 1/144 |

FOREIGN PATENT DOCUMENTS

| | | |
|---|---|---|
| JP | 2001-52906 | 2/2001 |
| JP | 2004-233267 | 8/2004 |
| JP | 2008-112812 | 5/2008 |
| JP | 2019-95355 | 6/2019 |
| KR | 10-1004404 | 12/2010 |
| WO | 2018/167903 | 9/2018 |
| WO | 2019/087755 | 5/2019 |

* cited by examiner

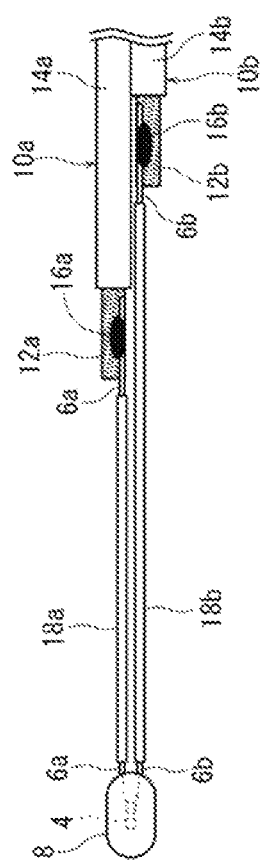

TEMPERATURE SENSOR

TECHNICAL FIELD

The present invention relates to a temperature sensor. More particularly, the present invention relates to a GRC (glass body sealed radial lead chip thermistor) type temperature sensor (a temperature sensor including a thermistor and a pair of lead-out wires connected at their front ends to the thermistor, and the thermistor and the front end portions of the lead-out wires are sealed with a glass body).

BACKGROUND ART

Japanese Patent No. 5830636 discloses a GRC type temperature sensor. This temperature sensor includes: a thermistor; a pair of lead-out wires connected at their front ends to the thermistor; a glass body for sealing the thermistor and front end portions of the pair of lead-out wires, a pair of lead wires connected at their front ends to the rear ends of the pair of lead-out wires; and a synthetic resin covering layer for covering the glass body, the pair of lead-out wires excepting the front end portions, and the front end portions of the pair of lead wires. The covering layer is formed of an inner layer melted with heat and an outer layer shrunk with heat.

SUMMARY OF THE INVENTION

Problem to be Solved by the Invention

The temperature sensor as described above involves a problem that the thermometric performance is not always favorable, because the thermistor in the glass is brought into contact with a thermometric site via a covering layer formed of the inner layer and the outer layer.

The present invention has been made in light of the aforementioned problems, and the principal object thereof is to improve the thermometric performance of the temperature sensor in the aforementioned embodiment, without causing any other problems such as breakage of the glass body, and breakage or short-circuit of the pair of lead-out wires.

Means for Solving the Problems

As a result of intensive studies, the present inventors have found that these technical challenges can be achieved by bringing the glass body peripheral surface into a direct contact with the outer layer without any substantial contact with the inner layer.

That is, the present invention provides a temperature sensor for achieving the aforementioned technical challenges. The temperature sensor comprises: a thermistor; a pair of lead-out wires each having a front end connected to the thermistor; a glass body for sealing the thermistor and front end portions of the pair of lead-out wires; a pair of lead wires each having a front end connected to a rear end of each of the pair of lead-out wires; and a synthetic resin covering layer for covering the glass body, the pair of lead-out wires excepting the front end portions, and the front end portions of the pair of lead wires. The covering layer having a tubular shape and formed of a laminate of tubular inner layer and a tubular outer layer is arranged by: elastically expanding so as to forcibly fit onto the glass body, the pair of lead-out wires excepting the front end portions, and the front end portions of the pair of lead wires; and heating to melt the inner layer and to shrink the outer layer. And the glass body has a peripheral surface in a direct contact with the inner surface of the outer layer.

Preferably, the glass body has a cylindrically-shaped peripheral surface, and the outer layer has an inner diameter equal to the outer diameter of the glass body in a state where the laminate of the inner layer and the outer layer is not fitted forcibly onto any of the glass body, the pair of lead-out wires excepting the front end portions, and the front end portions of the pair of lead wires. It is suitable that the inner layer is formed of a tetrafluoroethylene·perfluoroalkyl vinyl ether copolymer and the outer layer is formed of polytetrafluoroethylene. It is preferable that a thermosetting synthetic resin tube is fitted onto each of the pair of lead-out wires excepting the front end portion. Desirably, the tube is formed of polyimide, polyamide or polyamideimide. It is suitable that the connecting section for connecting the rear end of one of the pair of lead-out wires to the front end of one of the pair of lead wires is positioned longitudinally forward the connecting section for connecting the rear end of the other lead-out wire to the front end of the other lead wire. The covering layer has a small outer diameter front section, a first diameter-increasing section that follows the front section and has an outer diameter increasing gradually backward, an intermediate outer diameter middle section that follows the first diameter-increasing section, a second diameter-increasing section that follows the middle section and has an outer diameter increasing gradually backward, and a large outer diameter rear section that follows the second diameter-increasing section. The connecting section for connecting the rear end of the one of the pair of lead-out wires to the front end of the one of the pair of lead wires is positioned bridging the rear end portion of the first diameter-increasing section and the front end portion of the middle section. And the connecting section for connecting the rear end of the other lead-out wire to the front end of the other lead wire is positioned bridging the rear end portion of the second diameter-increasing section and the front end portion of the rear section.

Effect of the Invention

In the temperature sensor of the present invention, the thermistor is brought into contact with the thermometric site via only the glass body and the outer layer of the covering layer, without the inner layer of the covering layer interposed, so that the thermometric performance can be improved. Experiments by the present inventors have demonstrated that substantially there may not be found any other problems such as glass body breakage or breakage or short-circuit of the pair of lead-out wires even if the peripheral surface of the glass body was brought into contact with the thermometric site via only the outer layer of the covering layer.

BRIEF DESCRIPTION OF THE DRAWINGS

FIG. 2 is a partial side view showing principal sections or portions of the temperature sensor shown in FIG. 1.

MODE FOR CARRYING OUT THE INVENTION

Figure 1:
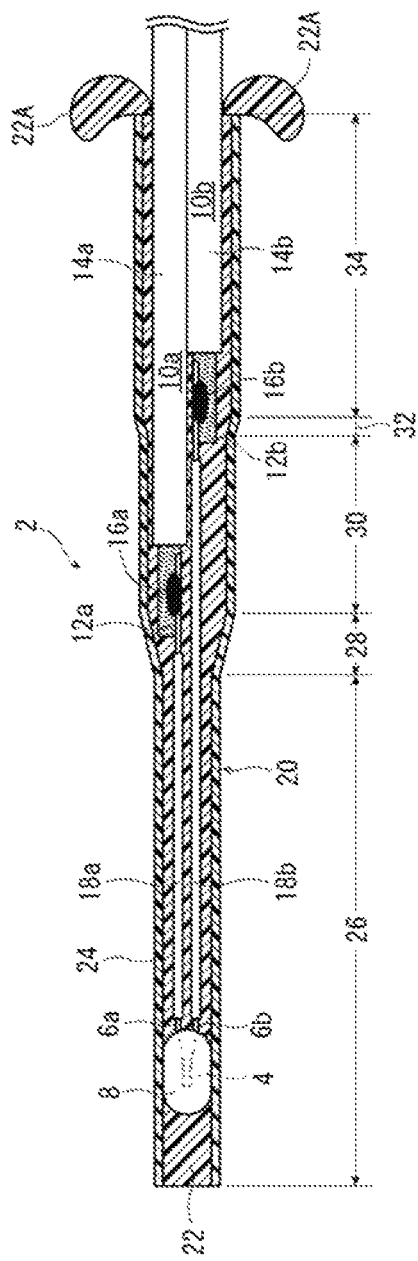
FIG. 1 is a cross-sectional view showing a preferred embodiment of a temperature sensor configured in accordance with the present invention.

Hereinafter, the present invention will be described more in detail with reference to drawings attached for illustrating a preferred embodiment of the temperature sensor configured in accordance with the present invention.

The explanation will be made with reference to FIGS. 1 and 2. A temperature sensor configured according to the present invention, which is designated as s whole by numeral 2, includes a thermistor 4, and a pair of lead-out wires 6a and 6b connected at their front ends to the thermistor 4. The pair of lead-out wires 6a and 6b are preferably formed of dumet wires. The thermistor 4 and the front end portions of the pair of lead-out wires 6a and 6b are sealed with a glass body 8. Suitably the outer peripheral surface of the glass body 8 is cylindrical. A pair of lead wires 10a and 10b each is connected at its front end to the rear end of each of the pair of lead-out wires 6a and 6b. The pair of lead wires 10a and 10b are preferably formed by covering core members 12a and 12b with sheath tubes 14a and 14b. Each of the core members 12a and 12b is composed of numbers of stranded wires, and the sheath tubes 14a and 14b are preferably formed of a fluorine-based synthetic resin such as PTFE (polytetrafluoroethylene). At the front ends of the pair of lead wires 10a and 10b, the sheath tubes 14a and 14b are removed respectively, thereby exposing the core members 12a and 12b. The pair of lead-out wires 6a and 6b are connected at their rear ends to the exposed core members 12a and 12b by welding or soldering.

A preferred embodiment can be clearly understood by referring to FIG. 1. Numeral 16a indicates a connecting portion for connecting the rear end of the lead-out wire 6a of the pair of lead-out wires 6a and 6b to the front end of the lead wire 10a of the pair of lead wires 10a and 10b. Numeral 16b indicates another connecting portion for connecting the rear end of the lead-out wire 6b of the pair of lead-out wires 6a and 6b to the front end of the lead wire 10b of the pair of lead wires 10a and 10b. Preferably, the connecting portion 16a for connecting the rear end of the lead-out wire 6a of the pair of lead-out wires 6a and 6b to the front end of the lead wire 10a of the pair of lead wires 10a and 10b is positioned a little forward the connecting portion 16b for connecting the rear end of the lead-out wire 6b of the pair of lead-out wires 6a and 6b to the front end of the lead wire 10b of the pair of lead wires 10a and 10b.

Each of the lead-out wires 6a and 6b has a part not sealed with the glass body 8. Suitably, tubes 18a and 18b are fitted onto the unsealed part. The tubes 18a and 18b are made of a thermosetting synthetic resin, preferably polyimide, polyamide or polyamideimide. It is preferable that the tubes 18a and 18b are fitted onto the substantially whole length of the unsealed parts of the lead-out wires 6a and 6b. Suitably, the inner diameters of the tubes 18a and 18b are somewhat larger than the outer diameters of the lead-out wires 6a and 6b, so that the tubes 18a and 18b can be fitted easily onto the lead-out wires 6a and 6b.

As clearly shown in FIG. 1, the temperature sensor 2 includes a tubular covering layer 20. The covering layer 20 covers the glass body 8, the pair of lead-out wires 6a and 6b excepting the front end portions sealed with the glass body 8, and the front end portions of the pair of lead wires 10a and 10b. Desirably, the covering layer 20 is composed of an inner layer 22 to be heat-melted and an outer layer 24 to be heat-shrunk. A preferred example of material for the inner layer 22 is PFA (tetrafluoroethylene·perfluoroalkyl vinyl ether copolymer) having a melting point of about 302 to about 310° C., and a preferred example of material for the outer layer 24 is PTFE (polytetrafluoroethylene) having a melting point of about 327° C. The covering layer 20 can be arranged suitably by expanding somewhat elastically a laminate of the tubular inner layer 22 and the tubular outer layer 24 so as to be forcibly fitted onto a target site, and then, heating to about 315° C. for instance. By heating to about 315° C., the inner layer 22 is melted and the outer layer 24 is shrunk. In this manner, the glass body 8, the pair of lead-out wires 6a and 6b excepting the front end portions sealed with the glass body 8, and the front end portions of the pair of lead wires 10a and 10b are covered firmly with the covering layer 20. The heat-melted inner layer 22 is then cooled to be cured. In some cases, the shrinkage of the outer layer 24 may cause outflow of the inner layer 22 from the rear end and the front end of the covering layer 20. Numeral 22A in FIG. 1 indicates the inner layer flowing out from the rear end of the covering layer 20. There is no particular necessity of removing the inner layer 22A flown out from the rear end of the covering layer 20. On the other hand, it is necessary to remove the inner layer flown out from the front end of the covering layer 20 (not shown), because this outflow of inner layer 22A may hinder attachment of the thermometric section of the temperature sensor 2 to the target site.

As clearly shown in FIG. 1, it is important that the inner layer 22 is not present substantially at the site where the glass body 8 is located, so that the outer layer 24 is brought into a direct contact with the glass body 8. This embodiment is available, for instance, by making the inner diameter of the outer layer 24 substantially equal to or somewhat larger than the outer diameter of the glass body 8 before the covering layer 20 composed of the inner layer 22 and the outer layer 24 is applied (to heat) on the target site. According to the embodiment, when the thermometric section of the temperature sensor 2 is attached to the thermometric site, the glass body 8 is brought into contact with the thermometric site via only the outer layer 24. In other words, the thermistor is brought into contact with the thermometric site via only the glass body and the outer layer 24 of the covering layer 20 (i.e., the inner layer 22 of the covering layer 20 is not interposed), thereby achieving preferable thermometric performance.

FIG. 1 shows the covering layer 20 arranged as described above. The covering layer 20 comprises: a small diameter front section 26, which is followed by a first diameter-increasing section 28 that has an outer diameter gradually increasing backward, an intermediate outer diameter middle section 30 that follows the first diameter-increasing section 28; a second diameter-increasing section 32 that follows the middle section 30 and has an outer diameter gradually increasing backward; and a large diameter rear section 34 that follows the second diameter-increasing section 32. This embodiment imparts excellent appearance and favorable handleability. The connecting portion 16a for connecting the rear end of the lead-out wire 6a to the front end of the lead wire 10a is positioned bridging the rear end portion of the first diameter-increasing section 28 and the front end portion of the middle section 30. The connecting portion 16b for connecting the rear end of the lead-out wire 6b to the front end of the lead wire 10b is positioned bridging the rear end portion of the second diameter-increasing section 32 and the front end portion of the rear section 34.

EXPLANATIONS OF LETTERS OR NUMERALS

2: Temperature sensor
4: Thermistor
6a: Lead-out wire
6b: Lead-out wire
8: Glass body
10a: Lead wire 10b: Lead wire
16a: Connecting portion
16b: Connecting portion
18a: Tube
18b: Tube
20: Covering layer
22: Inner layer
24: Outer layer

The invention claimed is:

1. A temperature sensor comprising:
a thermistor;
a first lead-out wire having a front end connected to the thermistor;
a second lead-out wire having a front end connected to the thermistor;
a glass body for sealing the thermistor, a front end portion of the first lead-out wire and a front end portion of the second lead-out wire;
a first lead wire having a front end connected to a rear end of the first lead-out wire;
a second lead wire having a front end connected to a rear end of the second lead-out wire; and
a synthetic resin cover layer,
wherein:
the synthetic resin cover layer is formed of a laminate of an inner layer and a tubular outer layer;
the glass body has a cylindrically-shaped peripheral surface;
the tubular outer layer covers the cylindrically-shaped peripheral surface of the glass body such that the cylindrically-shaped peripheral surface of the glass body is in direct contact with an inner surface of the tubular outer layer;
the inner layer covers the first lead-out wire except for the front end portion of the first lead-out wire;
the inner layer covers the second lead-out wire except for the front end portion of the second lead-out wire;
the inner layer covers a front end portion of the first lead wire; and
the inner layer covers a front end portion of the second lead wire.

2. The temperature sensor according to claim 1, wherein the tubular outer layer has an inner diameter equal to an outer diameter of the glass body in a state where the laminate of the inner layer and the tubular outer layer is not fitted onto any of the glass body, the first lead-out wire except for the front end portion of the first lead-out wire, the second lead-out wire except for the front end portion of the second lead-out wire, the front end portion of the first lead wire, and the front end portion of the second lead wire.

3. The temperature sensor according to claim 1, wherein:
the inner layer is formed of a tetrafluoroethylene-perfluoroalkyl vinyl ether copolymer; and
the tubular outer layer is formed of polytetrafluoroethylene.

4. The temperature sensor according to claim 1, wherein:
a first thermosetting synthetic resin tube is fitted onto the first lead-out wire except for the front end portion of the first lead-out wire; and
a second thermosetting synthetic resin tube is fitted onto the second lead-out wire except for the front end portion of the second lead-out wire.

5. The temperature sensor according to claim 4, wherein the first thermosetting synthetic resin tube and the second thermosetting synthetic resin tube are formed of polyimide, polyamide or polyamide-imide.

6. A temperature sensor comprising:
a thermistor;
a first lead-out wire having a front end connected to the thermistor;
a second lead-out wire having a front end connected to the thermistor;
a glass body for sealing the thermistor, a front end portion of the first lead-out wire and a front end portion of the second lead-out wire;
a first lead wire having a front end connected to a rear end of the first lead-out wire;
a second lead wire having a front end connected to a rear end of the second lead-out wire;
a first connecting section for connecting the rear end of the first lead-out wire to the front end of the first lead wire;
a second connecting section for connecting the rear end of the second lead-out wire to the front end of the second lead wire; and
a synthetic resin cover layer,
wherein:
the synthetic resin cover layer is formed of a laminate of an inner layer and a tubular outer layer;
the glass body has a cylindrically-shaped peripheral surface;
the tubular outer layer covers the cylindrically-shaped peripheral surface of the glass body such that the cylindrically-shaped peripheral surface of the glass body is in direct contact with an inner surface of the tubular outer layer;
the inner layer covers the first lead-out wire except for the front end portion of the first lead-out wire;
the inner layer covers the second lead-out wire except for the front end portion of the second lead-out wire;
the inner layer covers a front end portion of the first lead wire;
the inner layer covers a front end portion of the second lead wire;
the first connecting section is positioned longitudinally forward of the second connecting section;
the synthetic resin cover layer has: (i) a front section; (ii) a first diameter-increasing section which extends from the front section and increases backward in outer diameter; (iii) an intermediate section which extends from the first diameter-increasing section; (iv) a second diameter-increasing section which extends from the intermediate section and increases backward in outer diameter; and (v) a rear section which extends from the second diameter-increasing section;
an outer diameter of the front section is smaller than an outer diameter of the rear section;
the first connecting section is positioned so as to bridge a rear end portion of the first diameter-increasing section and a front end portion of the intermediate section; and
the second connecting section is positioned so as to bridge a rear end portion of the second diameter-increasing section and a front end portion of the rear section.

* * * * *